(12) United States Patent
Iwata

(10) Patent No.: US 6,247,778 B1
(45) Date of Patent: *Jun. 19, 2001

(54) RECORDING APPARATUS AND RECORDING METHOD

(75) Inventor: Kazuya Iwata, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/707,141

(22) Filed: Sep. 3, 1996

(30) Foreign Application Priority Data

Sep. 4, 1995 (JP) .................................................. 7-226832

(51) Int. Cl.$^7$ .................................................. B41J 29/38
(52) U.S. Cl. .............................................................. 347/16
(58) Field of Search .................................. 347/37, 20, 1, 347/104, 40, 41, 43, 16

(56) References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,920,355 | 4/1990 | Katerberg . |
| 5,121,142 | * 6/1992 | Iwazawa ............................ 347/16 X |
| 5,541,508 | * 7/1996 | Suzuki ............................ 324/207.21 |
| 5,627,570 | * 5/1997 | Hiramatsu et al. ................. 347/19 |

FOREIGN PATENT DOCUMENTS

| | | | |
|---|---|---|---|
| 3130812 | 6/1982 | (DE) | ............................ B41J/11/42 |
| 0-076948 | 4/1983 | (EP) | ............................ B41J/3/04 |
| 0-170166 | 2/1986 | (EP) | ............................ B41J/3/10 |
| 0-582432 | 2/1994 | (EP) | ............................ G06K/15/10 |
| 54-56847 | 5/1979 | (JP) . | |
| 59-123670 | 7/1984 | (JP) . | |
| 59-138461 | 8/1984 | (JP) . | |
| 60-71260 | 4/1985 | (JP) . | |
| 2-151470 | 6/1990 | (JP) | ............................ B41J/19/92 |

\* cited by examiner

Primary Examiner—John Barlow
Assistant Examiner—Raquel Yvette Gordon
(74) Attorney, Agent, or Firm—Fitzpatrick, Cella, Harper & Scinto

(57) ABSTRACT

The recording apparatus includes a recording head that performs dot-recording on the recording material through a plurality of recording elements arranged on the recording head; a mechanism to move the recording head in a main scan direction to perform recording; and a transport mechanism to feed the recording material in a sub-scan direction perpendicular to the main scan direction after each main scan operation. The transport mechanism is formed of a combination of driving elements including a driving source. The feeding distance that the recording material is fed in one feeding operation is set synchronized with the driving cycle of the driving elements including the driving source. This arrangement allows the recording head, which has an array of ink ejection nozzles arranged with a conventional density, to produce a dot-recorded image having a resolution two or more times higher than the conventional resolution.

13 Claims, 12 Drawing Sheets

RECORDING APPARATUS AND RECORDING METHOD

BACKGROUND OF THE INVENTION

1. Field of the Invention

The present invention relates to a recording apparatus and a recording method, and more specifically to a recording apparatus and a recording method used in information processing equipment such as printers, copying machines, facsimiles, word processors and computers.

2. Description of Related Art

A recording apparatus has been known, in which a plurality of recording elements, such as ink discharging elements each comprising an ink nozzle capable of ejecting individual ink droplets, a liquid path and a discharge energy generating element, are arranged in a recording head with a precise predetermined density, and in which the recording head mounted in a carriage, while traveling in a main scan direction, selectively ejects ink droplets from the ink nozzles onto a recording material to make ink recording in a height corresponding to the arrangement length of nozzles, followed by the recording material being fed in a sub-scan direction perpendicular to the main scan direction, with the above process repeated to make desired recording.

Such a conventional recording apparatus is known to have a recording head with 128 ink nozzles arranged at a pixel density of, for example, 360 dpi and to perform recording at a pixel density of 720 dpi, two times that of nozzle arrangement density. By referring to FIGS. 11 and 12, the configuration of a sheet feed drive transmission system in the conventional recording apparatus and the operation performed to realize recording will be explained.

In FIG. 11, designated 101 is a sheet feed motor, a pulse motor that makes one turn in 96 steps. A motor gear 102 is coaxial with the motor 101 and meshes with a slowdown large gear 103. A small gear 104 coaxial with the slowdown large gear 103 meshes with a sheet feed roller gear 105 to reduce a rotating speed of a sheet feed roller 106. The number of teeth (=Z) is set to 12 for the motor gear 102, 60 for the slowdown large gear 103, 20 for the small gear 104, and 60 for the sheet feed roller gear 105. The diameter of the sheet feed roller 106 is set to 16.17 mm.

Based on the above setting, the distance that a sheet is fed by each step of the sheet feed motor 101 and the distance that a sheet is fed by each turn of the motor are calculated as follows.

The distance that the sheet is fed by one step of the motor $$=\pi \times 16.17 \times 20/60 \times 12/60 \times 1/96$$

$$\approx 0.0353 \text{ mm} = 35.3 \ \mu m = 1/720 \text{ inch}$$

The distance that the sheet is fed by one turn of the motor $$=\pi \times 16.17 \times 20/60 \times 12/60 \approx 3.3888 \text{ mm}$$

That is, the amount of feed for one step of the sheet feed motor 101 corresponds to the pixel density of 720 dpi.

A conventional recording operation, in which with a sheet fed by the sheet feed motor 101 through drive gears, the recording head having 128 ink nozzles arranged at a pixel density of 360 dpi performs recording at a pixel density of 720 dpi, will be explained by referring to FIG. 12.

In FIG. 12, A to C each denotes an array of recorded dots (pixels) produced during three main scans by ink ejecting from 128 nozzles that are arranged at a pixel density of 360 dpi. E represents an amount of sub-scan performed between the main scan recordings of dot array A and dot array B, and F represents an amount of sub-scan performed between the main scan recordings of dot arrays B and C. That is, the amounts of sub-scan E and F are so set that the starting recorded dot of array B is positioned between recorded dots No. 64 and 65 of the array A and that the starting recorded dot of array C is spaced a certain distance from the recorded dot No. 128 of array A and positioned between the recorded dots No. 65 and 66 of array B.

That is, the amount of sub-scans E and F are, as shown in FIG. 12, 4.4803 mm and 4.5508 mm, respectively. Three main scan recordings and two sub-scan operations produce recorded dots shown at array D, which has a 720-dpi dot density at overlapped recorded portions between the arrays A and B and between the arrays B and C.

As described above, after each recording operation in the main scan direction by the recording head with 128 ink nozzles arranged at a 360 dpi pixel density, the sheet is fed in the sub-scan direction either by 127/720 inch (i.e., 127 steps) or 129/720 inch (i.e., 129 steps), which are alternated, thus achieving recording at a 720 dpi pixel density.

With the conventional recording apparatus, however, because the 360-dpi recording requires repeating only a 128/360-inch sheet feed, what is required of the sheet feed motor 101 is a performance of 48 steps/turn, with one step corresponding to the sheet feed of 1/360 inch. To realize a 720-dpi recording, however, requires two kinds of sheet feed-a 127/720-inch feed and a 129/720-inch feed-to be performed alternately, as described above. This requires the use of an expensive sheet feed motor 101 with a capability of 96 steps/turn to make one step match 1/720 inch. Another problem is that if the minimum feed can be made to match a 1/720 inch by changing the motor, a stop position is not accurate enough. For example, in FIG. 12, after the main scan recording is finished for the dot array A, a 127/720-inch sheet feed must be performed to place the nozzle corresponding to the dot No. 1 of array B 1/720 inch below the position of the dot No. 64 of array A. The distance between dot No. 64 and No. 65 is mere 70.6 $\mu m$ and a sheet feed precision required is at least about ±20 $\mu m$.

A commonly used pulse motor is what is generally called a four-phase motor which, when it stops in response to an input pulse, is known to shift its stop position in a four-step cycle. In the conventional recording apparatus such as described above, a 127-step input and a 129-step input are alternated. If we let the four phases be A, B, C and D and the motor is started from phase A, the motor stops at phase A and phase D alternately, increasing errors in the stop position.

Because the sheet feed motor gear 102 is fitted tightly over the motor shaft, it naturally makes a whole turn in 96 steps. Hence, the stop position for the 127-step and 129-step inputs apparently changes to 31 steps (=127−96) and 33 steps (=129−96) alternately. This means that in each sheet feed operation, where the motor gear 102 stops can be said to be virtually random. Further, a general problem is that if a certain rotation angle is to be transmitted, errors called "meshing errors" are caused by imperfect finish of the gear contours. This also adds to the sheet feed position errors.

It is conceivable to add another reduction gear in the drive system and change the reduction ratio to make one step of the sheet feed motor 101 match the 1/720-inch feed. In this case, however, the increased number of gears involved in the drive force transmission will increase the transmission errors.

As described above, with the conventional recording apparatus, when it is attempted to increase the recording density, the image produced is likely to be disturbed by poor sheet feed position precision.

SUMMARY OF THE INVENTION

The object of this invention is to solve the above-mentioned problems and to provide a recording apparatus that can perform recording at a resolution multiple times higher than the resolution of the conventional recording apparatus by using a recording head having nozzles arranged at a conventional density.

In a first aspect of the present invention, there is provided a recording apparatus comprising:

a recording head to perform recording on a recording material through an array of recording elements;

main scanning means for moving the recording head in a main scan direction along the recording material in order to perform recording; and transport means for feeding the recording material in a sub-scan direction perpendicular to the main scan direction after each main scan operation;

wherein the transport means comprises a combination of driving elements including a driving source, and a basic feeding distance that the recording material is fed in one feeding operation by the transport means is set synchronized with a driving cycle of the driving elements including the driving source.

Here, the recording by the recording head and feeding of the recording material by the transport means after each recording operation may be repeated a plurality of times to produce a dot-formed image which has a recording density in the sub-scan direction equal to an integer times an arrangement density of the recording elements.

The recording head may have recording elements arranged at a density of m dpi (dots per inch) and, when an overlapped recording using this recording head is performed while feeding the recording material K times, the recording head uses K×n+1 or K×n−1 (n is an integer) succeeding recording elements out of its whole recording elements and the basic feeding distance that the recording material is fed in one feeding operation is set to (n+1/K)×1/m or (n−1/K)×1/m to obtain a dot recording density of K×m dpi.

The recording head may be capable of color recording, uses K×n+1 or K×n−1 succeeding recording elements out of the whole recording elements arranged at a density of m dpi for each color and, in the overlapped recording involving the performance of the basic recording material feeding K times, produces a color image with a color recording density of K×m dpi for each color.

The basic feeding distance fed by the transport means may be set synchronized with the rotation cycle of at least the driving source.

The driving source of the transport means may be an excitation motor with a plurality of phases and the basic feeding distance fed by the transport means is set synchronized with the excitation phase cycle of at least the excitation motor.

The basic feeding distance fed by the transport means may be set synchronized with the driving cycle of at least the driving elements.

The recording elements may be ink ejection elements each of which ejects ink from an ink ejection nozzle by utilizing thermal energy generated by an ejection energy generating element.

In a second aspect of the present invention, there is provided a recording apparatus comprising:

a recording head having recording elements arranged at a predetermined density;

main scanning means for scanning the recording head in a main scan direction along a recording material in order to perform recording on the recording material; and transport means for feeding the recording material in a sub-scan direction perpendicular to the main scan direction;

wherein the transport means comprises a combination of a driving source and drive transmission elements, and a basic feeding amount that the recording material is fed by the transport means is set synchronized with the driving cycle of the driving source and the drive transmission elements.

Here, the drive transmission elements may include a reduction gear train and a feed roller driven by the reduction gear train and placed in contact with the recording material to feed the recording material, and the basic feeding amount is set synchronized with the rotation cycle of at least the driving source.

The driving source may be an excitation motor with a plurality of phases and the basic feeding amount is set matching with the excitation phase cycle of at least the excitation motor.

The driving source may be a pulse motor and the basic feeding amount may be set matching with one turn of the pulse motor.

The basic feeding amount may be set matching with the driving cycle of the drive transmission elements.

The recording elements may be ink ejection elements that utilize thermal energy generated by an ejection energy generating element to shoot ink droplets from ink ejection nozzles.

In a third aspect of the present invention, there is provided a recording method comprising the steps of:

moving in a main scan direction a recording head having recording elements arranged at a predetermined density to perform recording on a recording material;

feeding the recording material a basic feeding distance in a sub-scan direction perpendicular to the main scan direction;

repeating a two-step processing of first moving the recording head in the main scan direction to perform recording on the recording material and then feeding the recording material the basic feeding distance, and producing on the recording material a dot-recorded image having a recording density in the sub-scan direction equal to an integer times the predetermined density of the recording elements in the recording head.

Here, the recording head may have a plurality of recording elements arranged at a density of m dpi, and the recording is performed by using K×n+1 or K×n−1 succeeding recording elements out of the whole recording elements and by setting the basic feeding distance to (n+1/K)×1/m or (n−1/K)×1/m to produce a dot-recorded image with a recording density of K×m dpi (n is an integer).

The recording head may be a color recording head and may have a plurality of recording elements arranged at a density of m dpi for each color, and the recording is performed by using K×n+1 or K×n−1 succeeding recording elements out of the whole recording elements for each color and by setting the basic feeding distance to (n+1K)×1/m or (n−1/K)×1/m to produce a color dot-recorded image with a recording density of K×m dpi for each color (n is an integer).

The recording material may be fed by a transport means comprising a combination of a driving source and drive transmission elements, and the basic feeding distance that the recording material is fed by the transport means is set synchronized with the driving cycle of the driving source and the drive transmission elements.

The drive transmission elements may include a reduction gear train and a feed roller driven by the reduction gear train and placed in contact with the recording material to feed the recording material, and the basic feeding distance is set matching with the rotation cycle of at least the driving source.

The driving source may be a pulse motor and the basic feeding distance is set matching with one turn of the pulse motor.

With this invention, although the amount of sheet feed in the sub-scan direction performed by the transport means is affected by an overall error of combined drive elements including a driving source, because the amount of the sheet feed is synchronized with the overall drive cycle, there is no possibility that different errors may occur for individual sheet feed operations, thus making it possible to produce recorded images with high densities an integer times the recording element arrangement density in the recording head by utilizing the recording density inherent to the recording head itself and performing overlapped recording.

This invention is characterized in that the transport means comprises a plurality of combined drive elements including a driving source and that the amount of a single sheet feed by the transport means is set synchronized with the driving cycle of the drive elements including the driving source, so that a sheet feed mechanism can be realized which has a high precision with the start/stop position, allowing the resolution inherent to the recording head to be improved by several times and providing a recording apparatus which is inexpensive and has a high image quality.

The above and other objects, effects, features and advantages of the present invention will become more apparent from the following description of embodiments thereof taken in conjunction with the accompanying drawings.

DESCRIPTION OF THE PREFERRED EMBODIMENTS

Now, embodiments of the present invention will be described in detail and in concrete terms by referring to the accompanying drawings.

Figure 1:
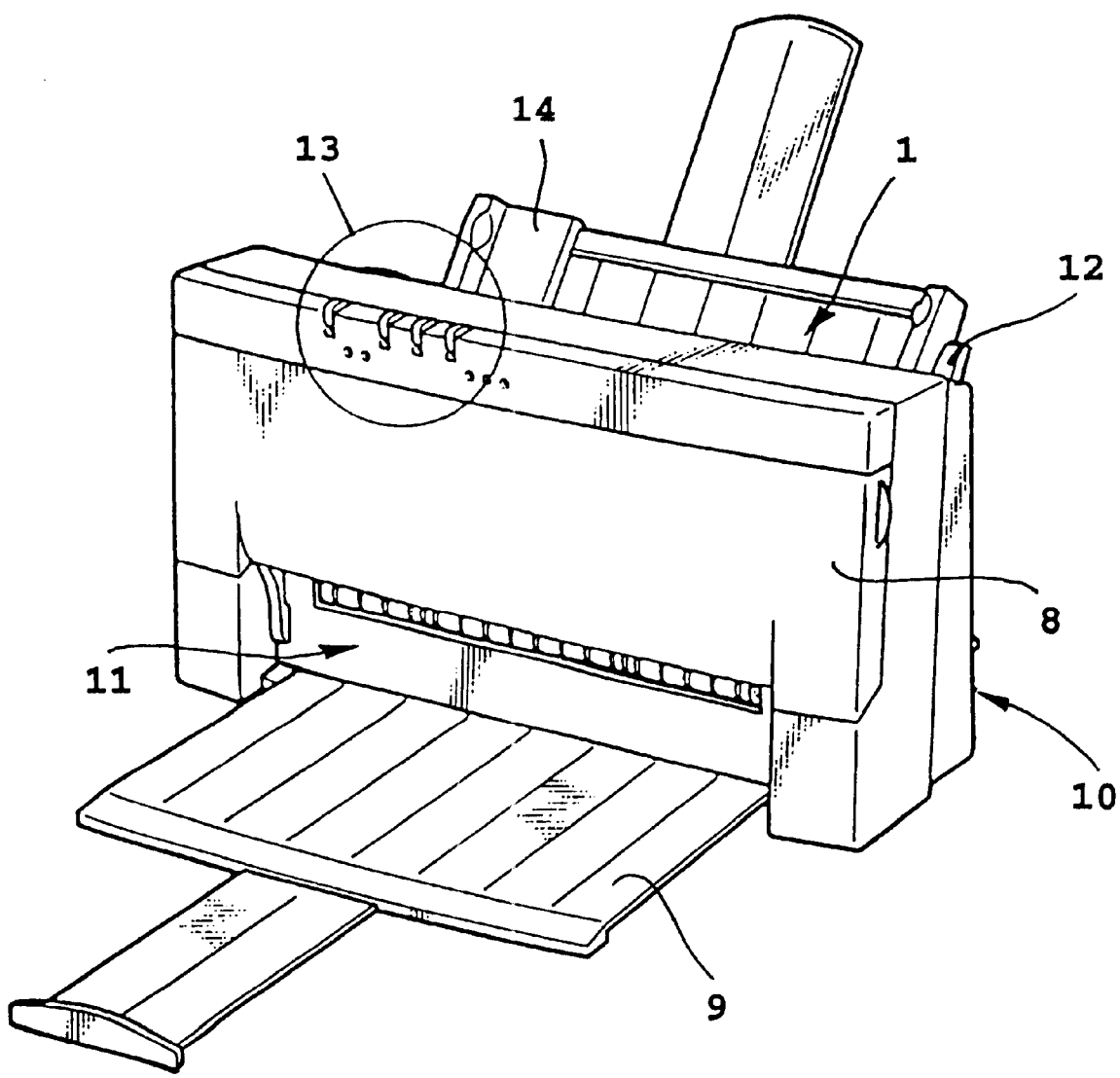
FIG. 1 is an external perspective view of an ink jet printer to which the present invention is applied.
Figure 2B:
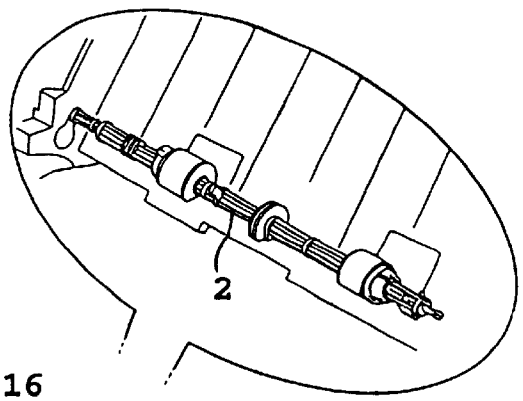
FIG. 2 is a perspective view showing an internal construction of the printer of FIG. 1.
Figure 2A:
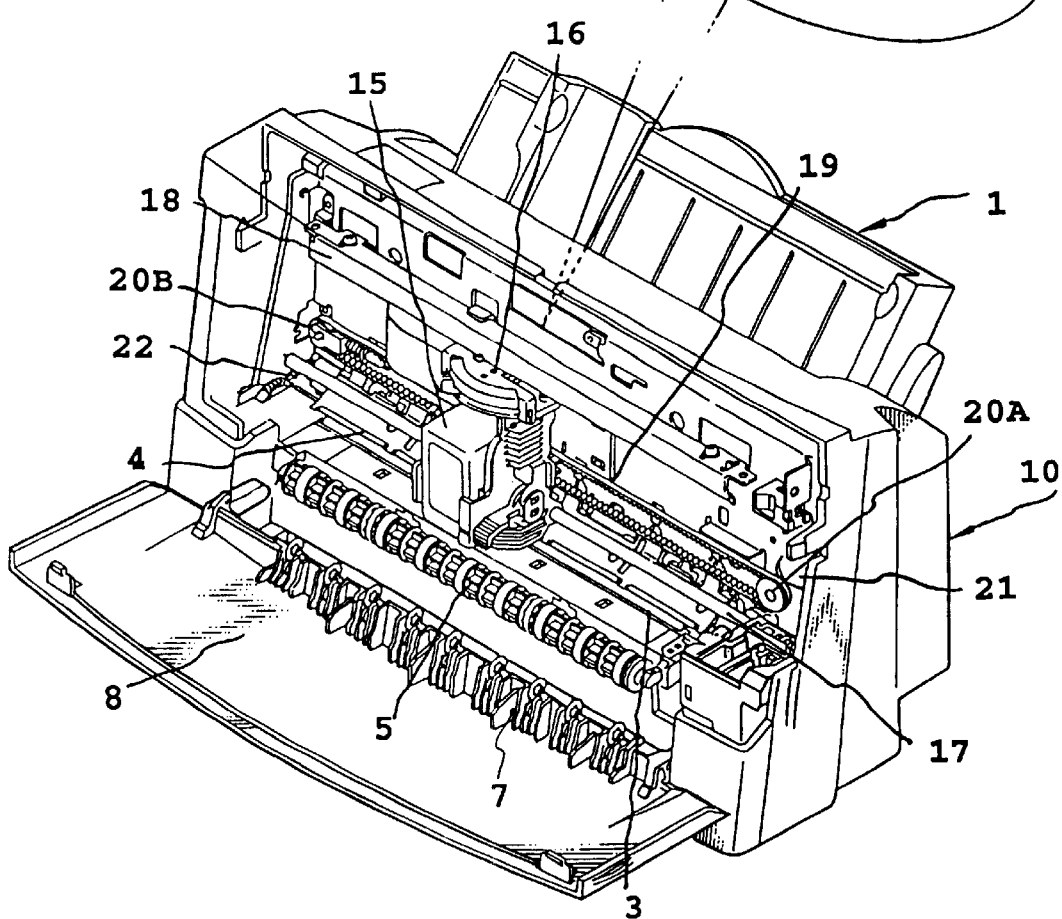
Figure 3:
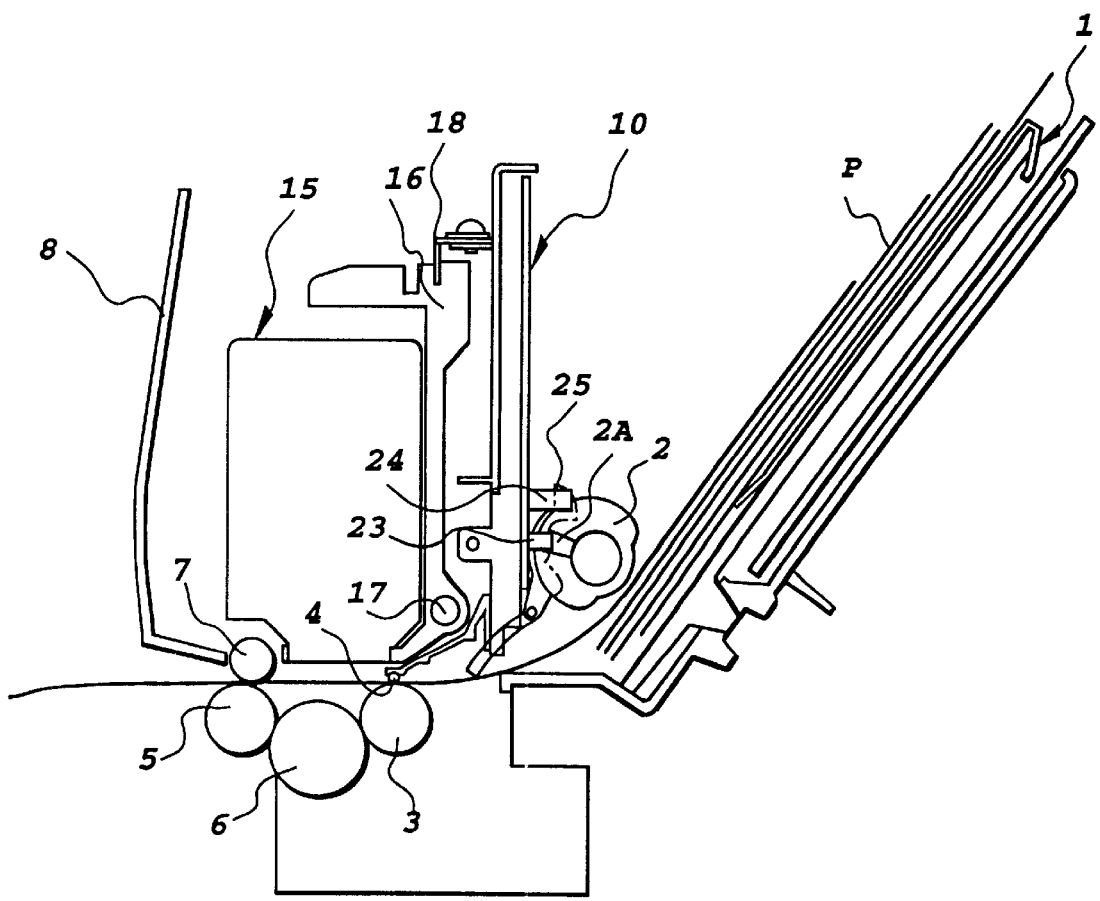
FIG. 3 is a cross sectional view showing an example configuration of a sheet feed drive transmission system of the printer of FIG. 1.

FIGS. 1 to 3 illustrate an example configuration of an ink jet printer to which the present invention is applied. In these figures, designated as 1 is a sheet feeder which holds recording materials (hereinafter referred to as recording sheets) P in a stacked state and feeds one sheet at a time from the top of the stack by a pickup roller 2. A feed roller 3 holds the recording sheet P fed from the pickup roller 2 between it and a pressure roller 4 and guides it to the recording position. A discharge roller 5 is meshed with the feed roller 3 through a transmission roller 6. A spur 7 has its tooth points in contact with a discharge roller 5 and cooperates with the discharge roller 5 to discharge the recorded sheet P out of the printer.

In this embodiment, to facilitate removing a recording sheet P when it is jammed, the front cover 8 can be opened toward the front as shown in FIG. 2. In FIG. 1, denoted as 9 is a removable tray provided at a sheet discharge outlet 11; 12 denotes a sheet P kind selection lever; 13 denotes an operation panel for the printer; and 14 denotes a sheet guide that is movable to left and right on the sheet feeder 1 and defines one of edge positions (not shown) of the recording sheet P stacked on the sheet feeder 1.

In FIG. 2, denoted as 15 is a cartridge incorporating an ink tank and a recording head in a single unit. A carriage 16 mounts the cartridge 15 and reciprocally moves in a main scan direction along a guide shaft 17. Designated as 18 is a guide rail for the carriage 16. A carriage drive timing belt 19 is connected to the carriage 16 to move it. The timing belt 19 is spread between a motor pulley 20A and a follower pulley 20B and is driven by a carriage motor 21. Designated as 22 is a transport and sheet feed motor for driving the feed roller 3 and associated components.

In FIG. 3, denoted as 2A is a roller position detection piece provided to the pickup roller 2; 23 denotes an optical roller sensor provided on a printer body 10 side; and 24 denotes a sheet end sensor that optically detects the rear edge of a recording sheet P fed by the pickup roller 2. The rotary position of the pickup roller 2 and the recording sheet P feeding operation are detected by the roller position detection piece 2A interfering with the roller sensor 23 and by a sheet detection piece 25 shown by a broken line interfering with the sheet end sensor 24, respectively.

Figure 4:
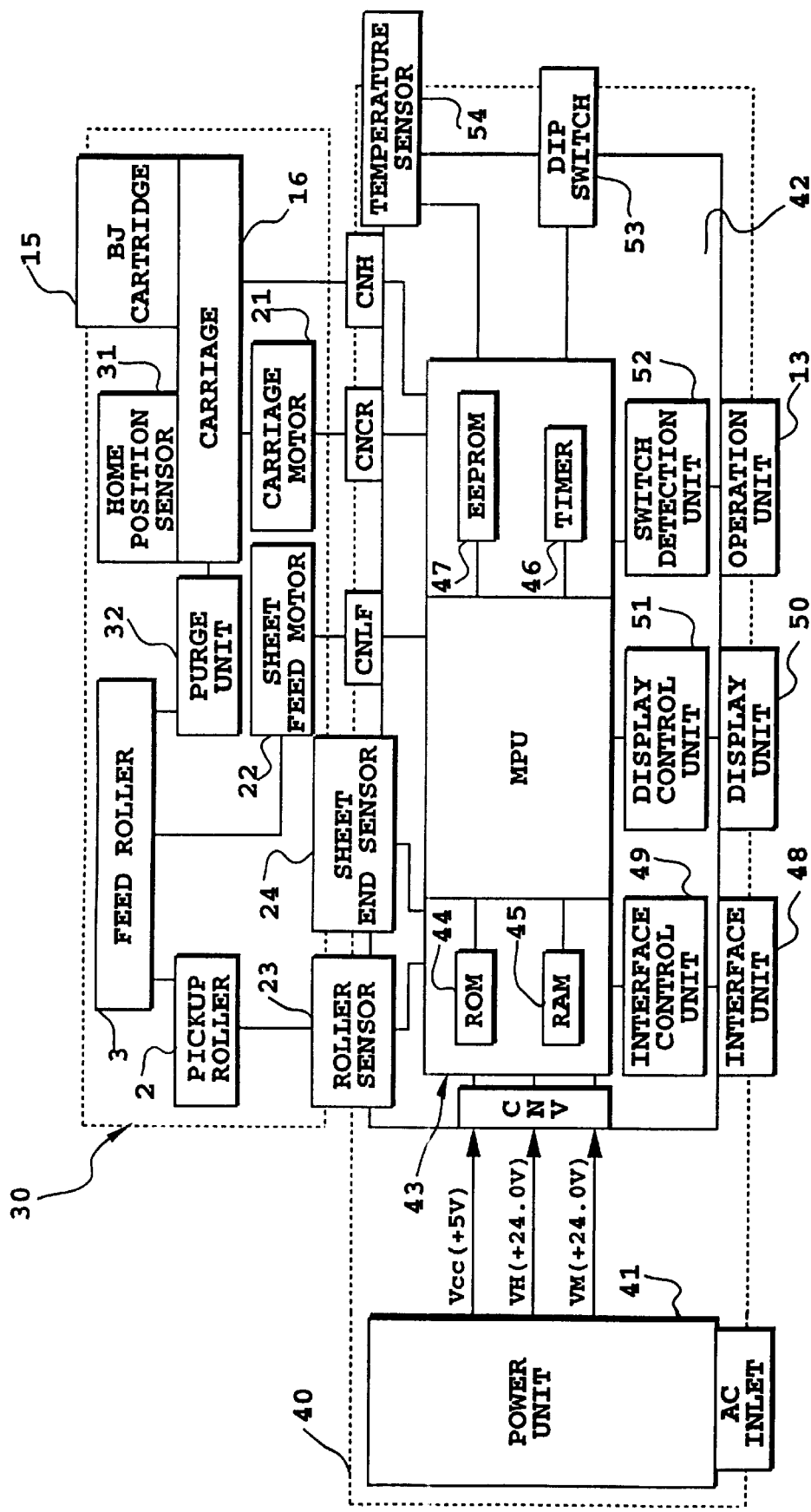
FIG. 4 is a block diagram showing an outline of an electric circuit configuration according to this invention.

Next, referring to FIG. 4, one example of a control circuit configuration according to this invention is explained. To facilitate understanding, this figure largely divides the circuitry into a mechanism section 30, which is a controlled side, and an electric section 40, which is a controlling side. Shown included in the mechanism section 30 are a home position sensor 31 that detects when the carriage 16 and the cartridge 15 are guided to the home position (HP) outside the recording area, and a purge unit 32 that recovers the performance of an ink ejection mechanism by coming into contact with an ink nozzle surface of the cartridge 15 near the HP. The electric section 40 includes a power unit 41 that supplies various voltages $V_{CC}$, $V_H$, $V_M$ through an input section CNV, a control printed circuit board 42, and a controller (MPU) mounted on the control printed circuit board 42.

The MPU 43 is a very small central processing unit that controls the equipment as a whole, and includes a ROM (read only memory) 44 that stores operation procedures for a variety of controls, a RAM (random access memory) 45 used as a work area during the control execution, a timer 46, and an EEPROM (electrically erasable and programmable read-only memory) 47 that stores information amount the number of stacked recording sheets P and the amount of used ink. Also included in the electric section 40 are an interface unit 48 that transfers signals to and from an external host device, an interface control unit 49 involved in the signal transfer, a display unit 50 that informs a user of various statuses of the equipment, a display control unit 51, and a switch detection unit 52 that identifies the kind of instructions entered through an operation unit 13.

The control printed circuit board 42 also includes a DIP switch 53 used to make changes to the initial setting and a temperature sensor 54 that monitors the temperature of the board 42 itself to ensure normal recording operation. Further, the board 42 has terminals CNLF and CNCR through which the driving of the sheet feed motor 22 and the carriage motor 21 is controlled by the MPU 43, and a terminal CNH through which the MPU 43 controls the recording head of the cartridge 15.

Figure 5C:
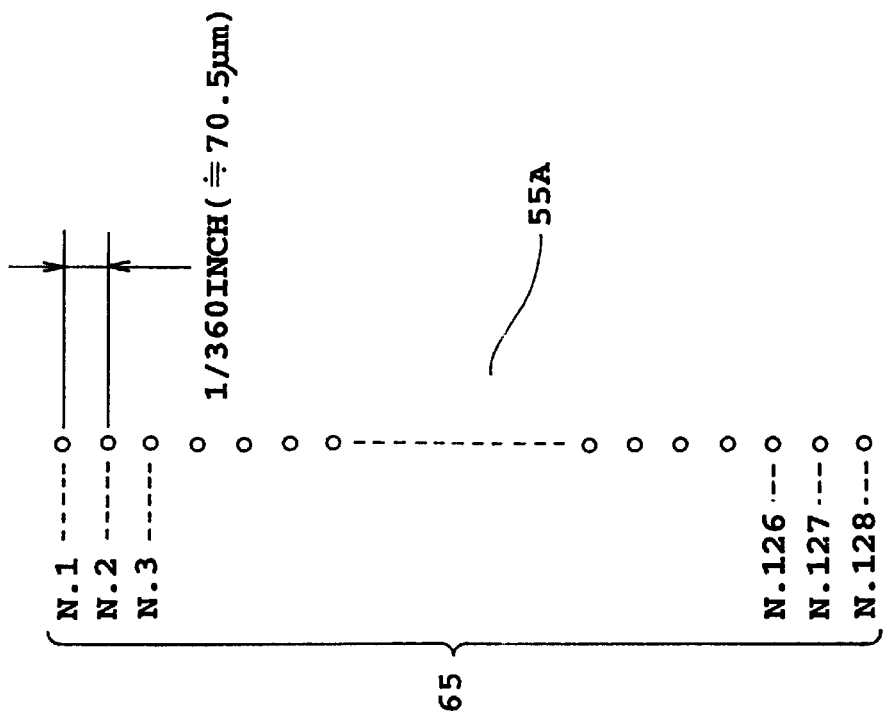
FIG. 5C is an enlarged view of an ink nozzle array of the ink jet cartridge of FIGS. 5A and 5B.
Figure 5A:
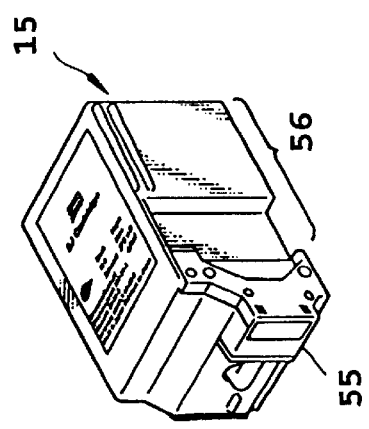
FIG. 5A is a perspective view showing a portion of an ink jet cartridge.
Figure 5B:
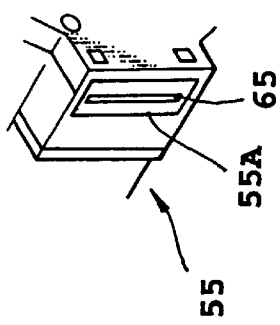
FIG. 5B is a partially enlarged view of FIG. 5A.

FIGS. 5A–5C show a detailed arrangement of ink nozzles in the cartridge 15 according to this invention. FIG. 5A represents an overall view of the cartridge 15 that contains a recording head 55 and an ink tank 56, and FIG. 5B represents an enlarged view of the recording head 55 portion shown in FIG. 5A. FIG. 5C shows an enlarged view schematically illustrating the arrangement and intervals of ink nozzles 65 at an ink nozzle surface 55A shown in FIG. 5B. Here, a single color cartridge 15 is shown as an example for use with a black ink. As shown in FIG. 5C, a total of 128 ink nozzles 65, from N1 to N128, are arranged in line at intervals of 1/360 inch, i.e., about 70.5 μm. Recording in one scan produces a dot image with a resolution of 360 dpi in the nozzle arrangement direction. In this embodiment, as detailed later, ink is shot from the nozzles 65 ranging from N1 to N127 and the sheet is fed a predetermined distance after each main scan has been completed, performing an overlapped recording by feeding the sheet twice (hereinafter referred to as a two-pass recording) thus realizing a 720-dpi high resolution recording.

Figure 6:
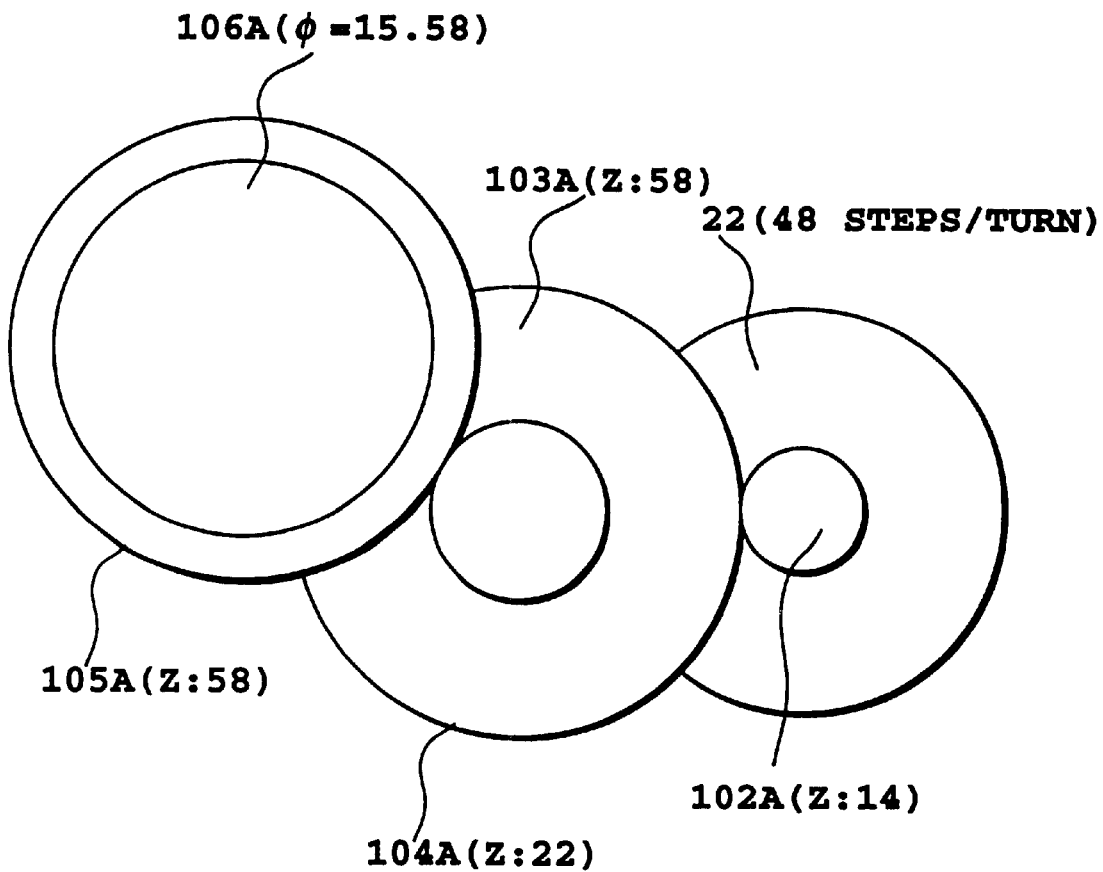
FIG. 6 is an explanatory diagram showing a sheet feed drive system according to this invention.
Figure 11:
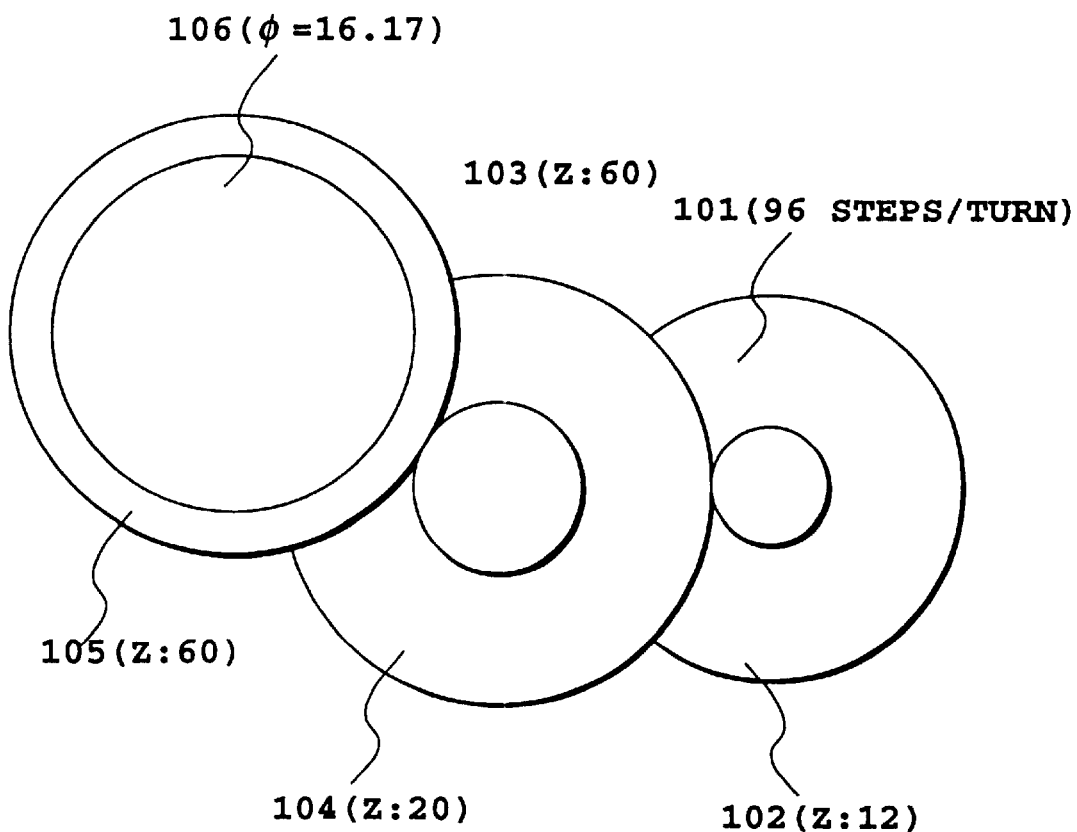
FIG. 11 is an explanatory diagram showing an example configuration of the conventional sheet feed drive transmission system.
Figure 12:
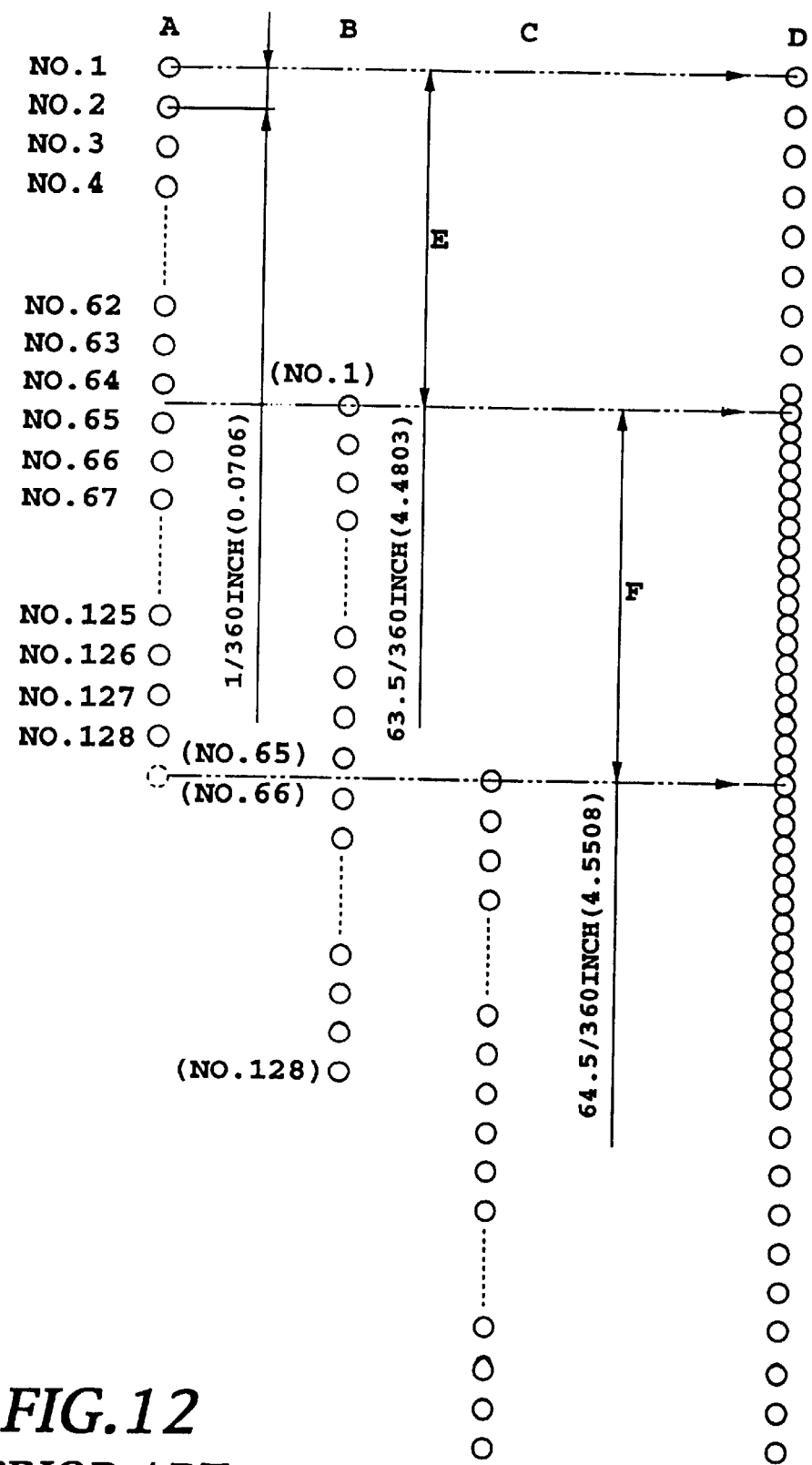
FIG. 12 is an explanatory diagram showing the distance that the sheet is fed by the conventional device.

FIG. 6 shows the configuration of a sheet feed drive transmission system according to this invention. A sheet feed motor 22, a motor gear 102A, a slowdown large gear 103A, a small gear 104A, a sheet feed roller gear 105A, and a sheet feed roller 106A are virtually the same in fundamental configuration as the components of FIG. 11 designated by reference numerals 101–106. Thus, their explanations are not given here. It is noted, however, that the sheet feed motor 22 of this embodiment makes one complete turn in 48 steps and that the gears 102A, 103A, 104A, 105A have 14, 58, 22 and 58 teeth, respectively, all different from the number of teeth of those gears shown in FIG. 11. The diameter of the sheet feed roller 106A is set to 15.58 mm.

Based on the above setting, the distance that the sheet is fed by one step of the sheet feed motor 22 and the distance that the sheet is fed by one turn of the motor are calculated as follows.

Distance that the sheet is fed by one step of the motor $$=\pi \times 15.58 \times 22/58 \times 14/58 \times 1/48$$

$$\approx 0.0934 \text{ mm} = 93.4 \text{ }\mu\text{m}$$

Distance that the sheet is fed by one turn of the motor $$=\pi \times 15.58 \times 22/58 \times 14/58$$

$$\approx 4.4814 \text{ mm}$$

Recording is performed by using the sheet feed drive and its transmission mechanism as well as the recording head 55 shown in FIG. 5. In this embodiment, when the two-pass recording is performed using 127 ink nozzles 65, N1–N127, out of the total of 128 nozzles, the basic distance that the sheet is fed is given by $$24.5 \times 1/360 \times 127/2 = 4.4803 \text{ mm (1 inch} = 25.4 \text{ mm)}$$

That is, with this embodiment, the basic feed distance shown above can virtually be secured by one turn of the step motor (sheet feed motor) which makes a complete turn in 48 steps.

Next, let us consider an error that may occur when the sheet feed does not strictly correspond to one turn of the step motor which is set to stop at an arbitrary position.

A pulse motor is generally used as the sheet feed motor 22 which in this embodiment has one complete turn divided in 48 steps, each step corresponding to a rotational angle of 7.5°. This value should be considered to include an error of ±5% due to variations in the internal construction of the motor. Because the sheet feed distance for one step is 93.4 μm as described above, this error translates to a variation of ±4.67 μm in the sheet feed distance with respect to an absolute position.

Further, there is an error in the contour of the sheet feed motor gear 102A. If the precision class is No. 3, the module 0.4, and the diameter of the pitch circle 5.6 mm, the overall meshing error should be considered to be in the range of 33 μm. When this error is taken as ±16.5 μm, it is necessary to allow for variations of ±0.094% for the pitch circle circumference of 17.59 mm, ±0.34° for the rotational angle position and ±4.2 μm for the sheet feed distance with respect to an absolute position.

Hence, if the sheet feeding is stopped at an arbitrary position by a motor that turns one step at a time, the above two positional shifts may in the worst case overlap producing an overall positional variation of about ±9 μm. In the 720-dpi resolution recording, the dot pitch is 35.3 μm and the positional variation of 9 μm translates to 25% of the dot pitch, which clearly constitutes a serious problem.

This embodiment, however, performs control in such a way that the fundamental sheet feed corresponding to one turn of the step motor 22 is repeated. This eliminates the error of ±9 μm.

Figure 7:
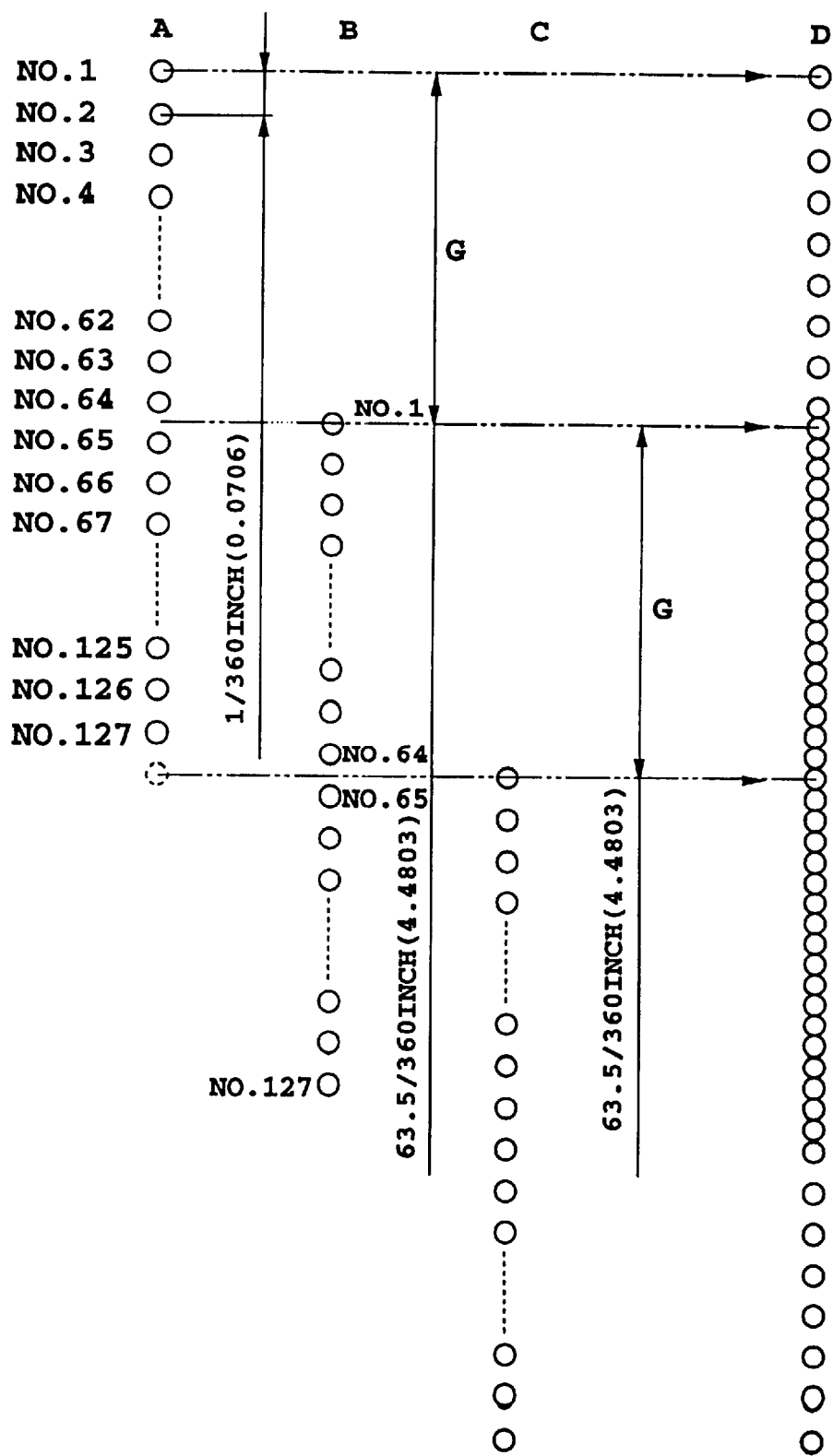
FIG. 7 is an explanatory diagram showing a fundamental sheet feeding distance according to this invention.

By referring to FIG. 7, fundamental sheet feed amount G when the two-pass recording is performed using the ink nozzles 65, N1 to N127, shown in FIG. 5 will be explained. In FIG. 7, an array A represents recorded dots No. 1–No. 127 arranged at intervals of 1/360 inch and made by ink droplets ejected from the nozzles, N1–N127, formed in the ink nozzle surface 55A of the recording head 55. An array B represents recorded dots when the sheet is fed 63.5/360 inch, i.e., 4.4803 mm in the sub-scan direction from the state of the array A, with the first dot No. 1 produced by the ink nozzle N1 being located 0.5/360 inch below the dot No. 64 of the array A. An array C represents recorded dots when the sheet is fed another 63.5/360 inch in the sub-scan direction from the state of the array B, with the first dot No. 1 produced by the ink nozzle N1 being located 1/360 inch below the dot No. 127 of the array A. An array D represents recorded dots when arrays A, B and C are superimposed together, indicating that the 720-dpi dot density can be achieved by the two-pass recording.

As described above, by using 127 ink nozzles 65 arranged at a 360-dpi density, fixing the sheet feed amount G at 63.5/360 inch and repeating recording, it is possible to realize recording at a 720-dpi density.

Next, one example of recording operation according to this embodiment will be explained.

In this embodiment, even when there is a blank in a recording pattern, the sheet feeding (63.5/360 inch) with a fixed pitch is repeated a required number of times, after which ink is ejected selectively from the ink nozzles N1–N127 according to the recording pattern to achieve the desired recording.

Figure 8:
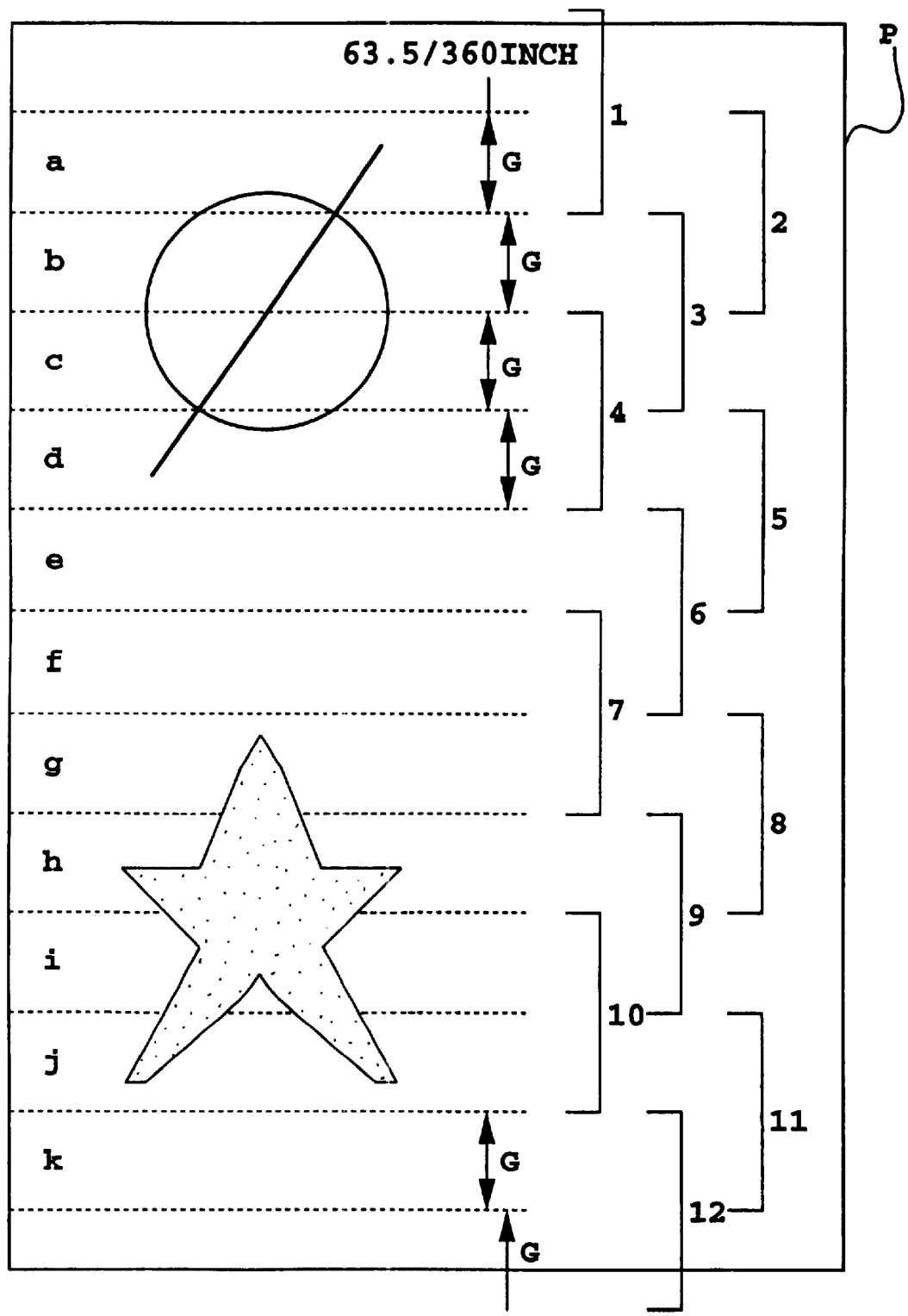
FIG. 8 is an explanatory diagram showing how an example of recording of this invention is performed for each sheet feeding.

The recording pattern in FIG. 8 is "Φ" and "★" vertically aligned. In this figure, numbers 1 to 12 shown at the right column represent the positions of a 127-nozzle array of the recording head relative to the recording sheet P in numerical sequence. The dashed lines represent border lines for the sheet feeding and the distance between the dashed lines equals to the sheet feed amount G (63.5/360 inch). In the case of this figure, the recording is completed with 12 sheet feedings. First, at the position 1, the recording head is swept in the main scan direction to print a part of "Φ" in the area a. The main scan recording at the position 1 prints only 50% (corresponding to 360 dpi) of the area a. After the sheet is fed another 63.5/360 inch, the ink nozzle array assumes the position 2. At this position the recording in the main scan direction completes the high density recording (equal to 720 dpi) in the area a and at the same time prints 50% of the image in a region b. The similar process is repeated for the succeeding positions 3, 4, . . . .

At position 6, the recording head is not swept in the main scan direction because area e and area f have no data to be recorded. Hence, the sheet is immediately fed from position 5 so that the recording head assumes position 7.

At position 7, the recording head prints an upper part of "★" in area g. At this time, the upper half of the ink nozzles N1–N64 over area f are not used, with only the lower half of the nozzles N65–N127 activated.

[Other Embodiments]

While the above embodiment sets the recording head at the resolution of 360 dpi and provides it with 127 ink nozzles for recording, the present invention is not limited to this setting. For example, this invention allows the sheet feeding distance to be fixed as long as the number of ink nozzles used is odd, and also enables the resolution to be doubled by the two-pass recording whatever the original resolution of the recording head. To describe in more general terms, if the resolution is m dpi and the number of nozzles used is $2n+1$ or $2n-1$ (n is an arbitrary integer), it is possible to produce a resolution of $2 \times m$ dpi with a fixed-distance feeding of $(n+0.5)/m$ or $(n-0.5)/m$ inch.

Figure 9C:
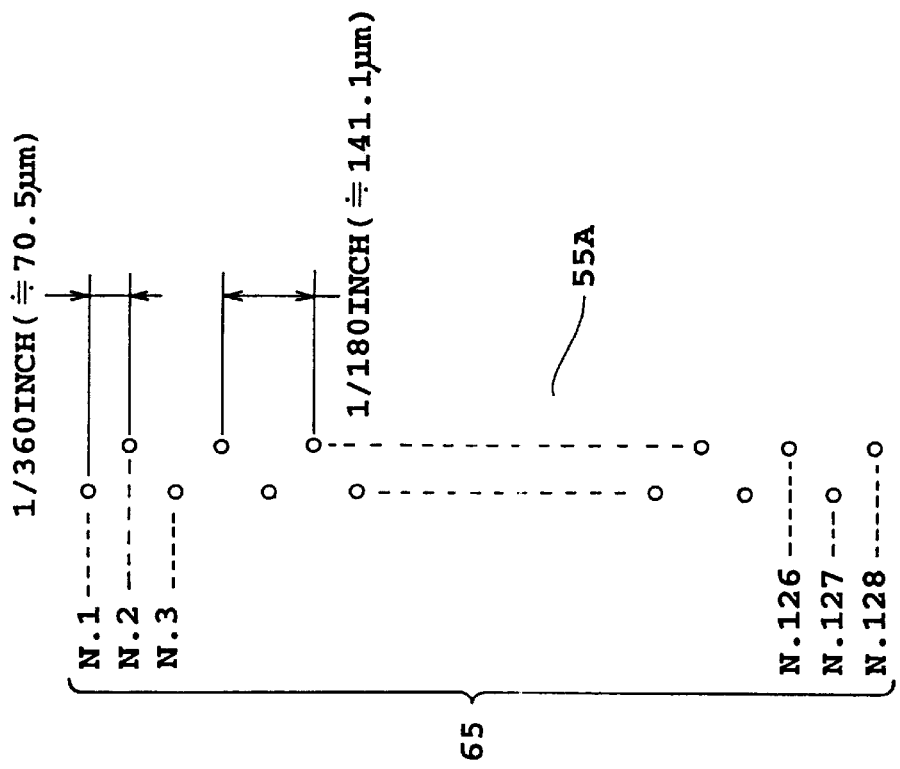
FIG. 9C is an enlarged view of an ink nozzle array of the ink jet cartridge of FIGS. 9A and 9B.
Figure 9A:
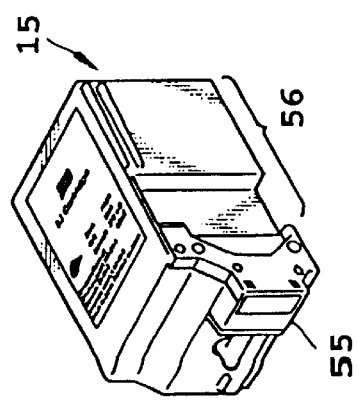
FIG. 9A is a perspective view showing another example of an ink jet cartridge.
Figure 9B:
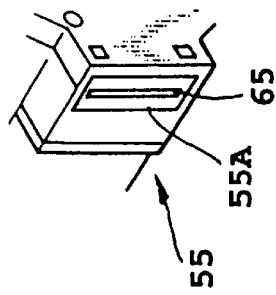
FIG. 9B is a partially enlarged view of FIG. 9A.

While in the above embodiment the ink nozzles are arrayed in a line perpendicular to the main scan direction, this invention is not limited to this arrangement. For example, the ink nozzles N1–N128 may be arrayed on a line at a certain angle with the main scan direction or, as shown in FIG. 9, set in a staggered arrangement.

Figure 10A:
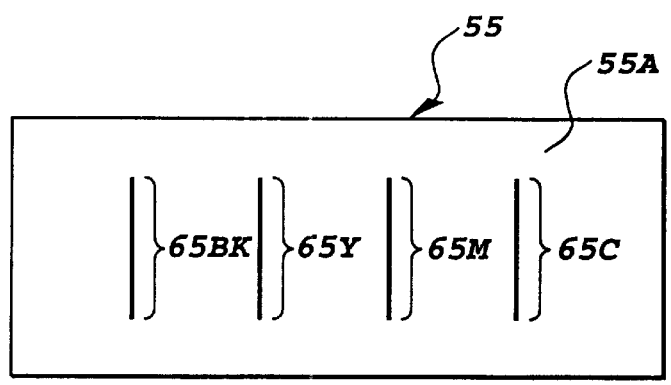
FIGS. 10A to 10C are explanatory diagrams each showing an example of an ink nozzle array capable of color recording as further embodiments of this invention.
Figure 10B:
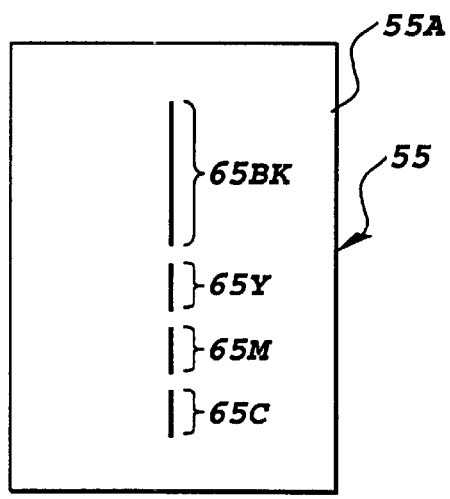
Figure 10C:
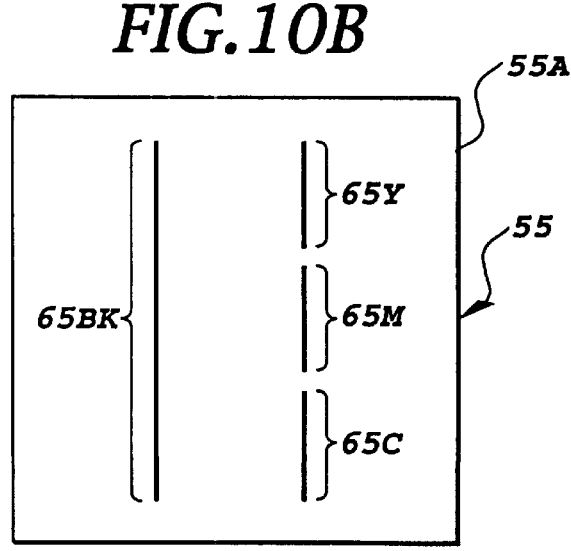

Further, although the above embodiment concerns a case where the recording head is a single-color black ink head, this invention is not limited to this recording head but may also be applied to a color recording heads as shown in FIGS. 10A–10C. In each of color recording heads, the interval between the ink nozzles may be set to, for example, 1/360 inch.

FIG. 10A shows ink-nozzle arrays 65Bk, 65Y, 65M and 65C for individual colors (black, yellow, magenta and cyan) are arranged in parallel to each other as in the above embodiment. In this case, the four colors each use 63 ink nozzles out of 64 and the sheet is fed a fixed distance of 31.5/360 inch. With this arrangement the density of recorded images can be increased.

FIG. 10B shows four color-ink-nozzle arrays arranged in line, with the black ink nozzle array 65Bk made up of 64 nozzles and yellow (Y), magenta (M) and cyan (C) nozzle arrays 65Y, 65M, 65C each made up of 24 nozzles. The Y, M and C nozzle arrays with fewer number of nozzles including Bk nozzle array all use 23 nozzles and a fixed sheet feeding amount is set at 11.5/360 inch.

FIG. 10C shows a black ink nozzle array consisting of 128 nozzles arranged in one line and three Y, M and C nozzle arrays 65Y, 65M, 65C, each consisting of 36 nozzles, all three arrays arranged in another parallel line. In this case, too, the Y, M and C nozzle arrays with fewer number of nozzles and Bk nozzle array use 35 nozzles each and a fixed sheet feeding amount is set at 17.5/360 inch.

It is noted that the present invention does not limit the construction of the recording head to the above examples.

Although the foregoing embodiments use a recording head with a resolution of 360 dpi and perform the two-pass recording to produce high-density printed images with 720 dpi, two times the recording head resolution, it is also possible to make various modifications. For example, by performing three-pass recording, the recorded resolution can be enhanced to three times an original recording head resolution no matter what the original resolution may be. The only requirement is that the number of nozzles used be set to an integer times 3 plus 1. For example, 127 nozzles may be used. The amount of sheet feeding for this recording can be fixed at 127/3/360 inch.

Generally, when a k-pass recording is performed using a recording head with a resolution of m dpi to produce an image with a pixel density of $k \times m$ dpi, the required number of nozzles is only $k \times n+1$ or $k \times n-1$ (n is an arbitrary integer). The sheet feeding amount can be fixed at $(n+1/k) \times 1/m$ or $(n-1/k) \times 1/m$ inch.

Let us take an example case of k=3 passes, m=360 (dpi) and n=42. Then, performing a 3-pass recording operation with a head having $3 \times 42-1=125$ nozzles arranged at 360 dpi and at the same time repeating a fixed feeding of $(42-1/3)/360=41.66 \ldots /360$ inch results in a recorded image with $360 \times 3=1080$ (dpi).

While in the above embodiments, the fixed sheet feeding amount is obtained by one turn of the sheet feed motor, it is also possible to make setting in such a manner as to produce the fixed sheet feeding amount by an integer number of rotations of the sheet feed motor.

When a four-phase pulse motor is used as a driving source for feeding a sheet, because the motor's stop position shifts in a four-step cycle, the motor needs to be stopped at the same phase in order to achieve the fixed feeding of sheet. This is expected to improve the precision of sheet feeding. Such an arrangement, too, is within the scope of this invention. Further, because gears in the driving system have cyclic transmission errors that accompany each rotation of gears, it is needless to say that the amount of fixed feeding should preferably be made to match the period of one turn of each transmission gear. This arrangement also includes matching the amount of fixed feeding to any cyclic transmission errors in the transmission system.

In the above explanation, the recording head has been described to incorporate as the recording elements ink ejection nozzles that shoot ink droplets by the action of the ejection energy generating element onto the recording material (recording sheet), thus forming a recorded image with landed ink dots. The recording elements are not limited to such ink ejection nozzles as long as they are capable of performing the dot recording.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. in addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A recording apparatus comprising:
    a recording head to perform recording on a recording material through an array of recording elements;
    main scanning means for moving the recording head in a main scan direction along the recording material in order to perform recording; and
    transport means for feeding the recording material in a sub-scan direction perpendicular to the main scan direction after each main scan operation, wherein said transport means feeds the recording material by a predetermined basic feeding distance during one feeding operation,
    wherein said transport means comprises a combination of driving elements, including a pulse motor having a plurality of phases,
    wherein in the case where said pulse motor stops at a different phase of the plurality of phases when the predetermined basic feeding distance in one feeding operation by said transport means is completed, a transmission error is larger than that in which said pulse motor stops at a same phase of the plurality of phases when the predetermined basic feeding distance in one feeding operation by said transport means is completed, and
    wherein said pulse motor stops at the same phase of the plurality of phases when the predetermined basic feeding distance in one feeding operation by said transport means is completed.

2. A recording apparatus as claimed in claim 1, wherein the recording elements are arranged at a specific density, and wherein the recording by said recording head and the recording material feeding by said transport means after each recording operation are repeated a plurality of times to produce a dot-formed image which has a recording density in the sub-scan direction equal to an integral multiple of the density of the recording elements.

3. A recording apparatus as claimed in claim 2, wherein said recording head has recording elements arranged at a density of m dpi (dots per inch) and, when an overlapped recording using this recording head is performed while feeding the recording material K times, a dot recording density of K×m dpi is obtained by one of:
    (i) using (K×n)+1 successive recording elements of the recording head for recording (where n is an integer), and setting the basic feeding distance that the recording material is fed in one feeding operation to $((n+1)/K) \times 1/m$, and
    (ii) using (K×n)−1 successive recording elements of the recording head for recording (where n is an integer), and setting the basic feeding distance that the recording material is fed in one feeding operation to $((n-1)/K) \times 1/m$.

4. A recording apparatus as claimed in claim 3, wherein the recording head is capable of color recording, uses recording elements arranged at a density of m dpi for each color and, in the overlapped recording involving the performance of the basic recording material feeding K times, produces a color image with a color recording density of K×m dpi for each color by using a number of successive recording elements equal to one of (K×n)+1 and (K×n)−1.

5. A recording apparatus according to claim 1, wherein the driving elements including said pulse motor each have a rotation cycle, and wherein the basic feeding distance fed by said transport means is set to be synchronized with the rotation cycle of at least said pulse motor.

6. A recording apparatus as claimed in claim 1, wherein the basic feeding distance fed by the transport means is set to be synchronized with the driving cycle of at least the driving elements.

7. A recording apparatus as claimed in claim 1, wherein said recording elements are ink ejection elements each of which ejects ink from an ink ejection nozzle by utilizing thermal energy generated by an ejection energy generating element.

8. A recording apparatus according to claim 1, wherein said driving elements include a reduction gear train and a feed roller driven by the reduction gear train and placed in contact with the recording material to feed the recording material, and wherein said pulse motor and said driving elements each have a predetermined rotation cycle and the predetermined basic feeding distance is set to be synchronized with the rotation cycle of at least said pulse motor.

9. A recording apparatus according to claim 8, wherein the predetermined basic feeding distance is set to be matched with one turn of said pulse motor.

10. A recording apparatus as claimed in claim 8, wherein said predetermined basic feeding distance is set to be matched with the driving cycle of the driving elements.

11. A recording apparatus comprising:
    a recording head to perform recording on a recording material through an array of recording elements;
    main scanning means for moving the recording head in a main scan direction along the recording material in order to perform recording; and
    transport means for feeding the recording material in a sub-scan direction perpendicular to the main scan direction after each main scan operation, wherein said transport means feeds the recording material by a predetermined basic feeding distance during one feeding operation,
    wherein said transport means comprises a combination of driving elements, including a motor,
    wherein in the case where said motor stops at a different rotational position when the predetermined basic feeding distance in one feeding operation by said transport means is completed, a transmission error is larger than that in which said motor stops at a same rotational position when the predetermined basic feeding distance in one feeding operation by said transport means is completed, and
    wherein the predetermined basic feeding distance in one feeding operation by said transport means is performed by an integer number of rotations of the motor.

12. A recording method comprising the steps of:
    recording on a recording material through an array of recording elements of a recording head;
    moving the recording head in a main scan direction along the recording material in order to perform recording; and
    feeding the recording material in a sub-scan direction perpendicular to the main scan direction after each main scan operation using transport means, wherein the recording material is fed by a predetermined basic feeding distance during one feeding operation,
    wherein said transport means comprises a combination of driving elements, including a pulse motor having a plurality of phases, wherein in the case where said pulse motor stops at a different phase of the plurality of phases when the predetermined basic feeding distance in one feeding operation by said transport means is completed, a transmission error is larger than that in which said pulse motor stops at a same phase of the plurality of phases when the predetermined basic feeding distance in one feeding operation by said transport means is completed, and wherein said pulse motor stops at a same phase of the plurality of phases when the predetermined basic feeding distance in one feeding operation by said transport means is completed.

13. A recording method comprising the steps of:

recording on a recording material through an array of recording elements of a recording head;

moving the recording head in a main scan direction along the recording material in order to perform recording; and feeding the recording material in a sub-scan direction perpendicular to the main scan direction after each main scan operation using transport means, wherein said transport means feeds the recording material by a predetermined basic feeding distance during one feeding operation, wherein said transport means comprises a combination of driving elements, including a motor, wherein in the case where said motor stops at a different rotational position when the predetermined basic feeding distance in one feeding operation by said transport means is completed, a transmission error is larger than that in which said motor stops at a same rotational position when the predetermined basic feeding distance in one feeding operation by said transport means is completed, and wherein the predetermined basic feeding distance in one feeding operation by said transport means is performed by an integer number of rotations of the motor.

* * * * *